(12) United States Patent
Fuerst et al.

(10) Patent No.: US 7,563,396 B2
(45) Date of Patent: *Jul. 21, 2009

(54) FABRICATION OF IMPROVED CONTACT LENS UTILIZING POLYMER ELECTROSPINNING

(75) Inventors: Randall Fuerst, Orangevale, CA (US); Joseph Bango, New Haven, CT (US); John Fenn, Richmond, VA (US); Michael Dziekan, Naugatuck, CT (US)

(73) Assignee: Ocugenics, LLC, Orangevale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/735,451

(22) Filed: Dec. 12, 2003

(65) Prior Publication Data

US 2005/0067287 A1 Mar. 31, 2005

Related U.S. Application Data

(60) Provisional application No. 60/433,324, filed on Dec. 13, 2002.

(51) Int. Cl.
*B29D 11/00* (2006.01)
(52) U.S. Cl. .................................. 264/1.36; 264/465
(58) Field of Classification Search ................. 264/1.1, 264/1.36, 465, 464
See application file for complete search history.

(56) References Cited

U.S. PATENT DOCUMENTS

| | | | | |
|---|---|---|---|---|
| 5,222,663 | A | * | 6/1993 | Noakes et al. .................. 239/3 |
| 6,559,119 | B1 | * | 5/2003 | Burgess et al. .................. 514/2 |
| 2002/0090725 | A1 | * | 7/2002 | Simpson et al. ............. 435/402 |

* cited by examiner

*Primary Examiner*—Mathieu D. Vargot
(74) *Attorney, Agent, or Firm*—James F. Kirk

(57) ABSTRACT

A method and means of providing an improved refractive correction contact lens which increases user comfort, retards protein and lipid deposition, and can be utilized for pharmaceutical delivery. The invention discloses a technique for creating polymer fibril diameters and spacing that duplicates the optical transmission and diffusion characteristics of natural corneal collagen.

14 Claims, 7 Drawing Sheets

FABRICATION OF IMPROVED CONTACT LENS UTILIZING POLYMER ELECTROSPINNING

Reference Prior Applications: Claim Priority of Provisional Application 60/433,324 filed Dec. 13, 2002.

BACKGROUND

1. Field of Invention

This invention relates in general to refractive correction and in particular to a method and means of fabricating an improved permeable contact lens that mimics the native corneal structure.

2. Background Description of Prior Art

While significant advances have been achieved in the field of contact lens design and fabrication, many problems still exist. Of these, paramount of which is the fact that the polymers utilized are created as a solid or at best, as semi permeable solid structures. These structures reduce the available oxygen to the corneal surface, minimize tear and aqueous transport through the lens, and act as a nucleation point for protein buildup. The disclosed invention allows for situations that would enable the manufacture of a contact lens that would have a high oxygen permeability, while allowing the option of having either a lipid impermeable or lipid permeable functionality. This functionality will be of great importance in designing a therapeutic contact lens, in addition to a refractive contact lens. In either case, one would want a high degree of oxygen permeability as the cornea is an avascular membrane and receives its oxygen supply directly through the air. Any impediment that obstructs the corneal surface with direct contact with the surrounding air would be detrimental. Examination of the prior art has not revealed any technology, which approaches the novelty, efficacy, and ease of implementation that the disclosed invention teaches. Additionally, it is common for a contact lens to be constructed as completely homogenous or with a homogenous outer surface enclosing a hydrogel or polymeric interior, which means that the lens outer covering material is consistent throughout its structure. With the disclosed invention, it is now possible to create a contact lens structure that is made out of varying layers of differing polymer materials, with the possibility of interdispersement of trapped drug layers to maintain a localized point of contact with the desired drug or medication and the corneal surface. The degree of surface hydrophobocity and hydrophilicity could be engineered into the surface, along with the ability to restrain lipid transport into the lens structure from degrading optical clarity. One of the additional benefits of manufacturing by the described invention is that the base surface side (eye contact surface) of the contact lens could be made of a completely different material than there is on the outside surface of the contact lens. For instance, the base surface side (cornea contact surface) could be made hydrophilic to provide superior wetting while the outside (air contact surface) could be made hydrophobic and prevent the problem of ordinary contact lenses from having a degraded oxygen permeability. Materials that are generally incompatible with the eye could still be used to construct a contact lens, since they will not be coming into actual contact with the eye surface. A wide assortment of contact lenses could be constructed by utilizing this ability of the described invention. Again, any means of producing a polymer lens which reduces the diffusion rate of oxygen, reduces the effectiveness of the lens and could in the long term cause irreparable damage to the corneal surface. Subtle changes in the diffusion rate can cause significant loss in visual acuity. Also, nonnatural polymers can be rejected by the immune system. The disclosed invention, being of preferably benign genetically engineered collagen or other suitable polymer, yields a lens structure that is virtually indistinguishable to native natural corneal tissue. The process allows for the person's own native collagen to be harvested or grown and used to create the contact lens. This would enable a contact lens to be produced that is virtually guaranteed not to be rejected by a person's own immune system.

OBJECTS AND ADVANTAGES

The disclosed invention overcomes many of the limitations inherent in current contact lens design and production, and much more, including the following:

(a) It provides a means of producing contact lenses that exhibit the optical and diffusive characteristics of natural corneal tissue.

(b) The disclosed invention affords a means of a scaffold lens structure that can permit the absorption or adsorption of specific chemical species for the purpose of drug delivery to treat specific eye conditions.

(c) The disclosed invention affords a means of a scaffold lens structure that can permit the absorption or adsorption of specific chemical species for the purpose of minimizing or eliminating protein deposits.

(d) The disclosed invention offers a means to reduce or eliminate corneal dry eye condition by permitting increased diffusion of tear fluids and by delivering selected compounds to natural tear components.

(e) The disclosed invention yields a means of producing a viable collagen polymer refractive correcting contact lens whose characteristics duplicate natural tissue. This tissue is refractive, by definition, and can be ablatable by lasers or other means while in situ on the patient's cornea.

(f) The disclosed invention promotes corneal health and reduces the possibility of conventional lens caused infections since the diffusive characteristics promote anti microbial agent distribution natural to the eye.

(g) The disclosed invention reduces abnormal blood vessel in growth which occurs when long term contact lens wear reduces the average oxygen transport to the corneal surface. The "open" diffusive structure of the electrospun lens permits the same diffusion of ambient oxygen to the corneal surface as does native tissue.

(h) The disclosed invention affords a means of a scaffold lens structure that can permit the absorption of adsorption of various chemical species for the purposes of drug delivery to precise portions of the cornea, and thereby keep a regulated, time lapsed drug delivery confined to not only the cornea, but a specific regions of the cornea.

(i) The disclosed invention affords a means of manufacturing a contact lens with the ability to control the location and the amount of surface hydrophobocity and hydrophilicity tailored to the application, as required.

Other objectives and possible applications of the invention will become evident to those knowledgeable in the related arts. The first of which is the ability to create a living corneal refractive lens to be placed onto existing stromal tissue. The disclosed invention teaches a method and means of using a process known as "electrospinning" to produce a permeable contact lens composed of micro strands that approximate the nanometer size fibrils of natural human corneal stromal collagen. The fibril diameter is regarded as the principal factor in achieving corneal transparency. The fibril strands are deposited onto an appropriate target, which allows a suitable polymer fibril scaffold "mat" to develop. The density and configuration of this "mat" determine the permeability of the structure to aqueous fluids, lipids, and gases. The disclosed invention teaches how to control the density and orientation of these fibrils in order to achieve the desired diffusive and optical parameters compatible with natural tissue.

PHARMACEUTICAL DELIVERY AND SURFACE ADSORPTION

Figure 1:
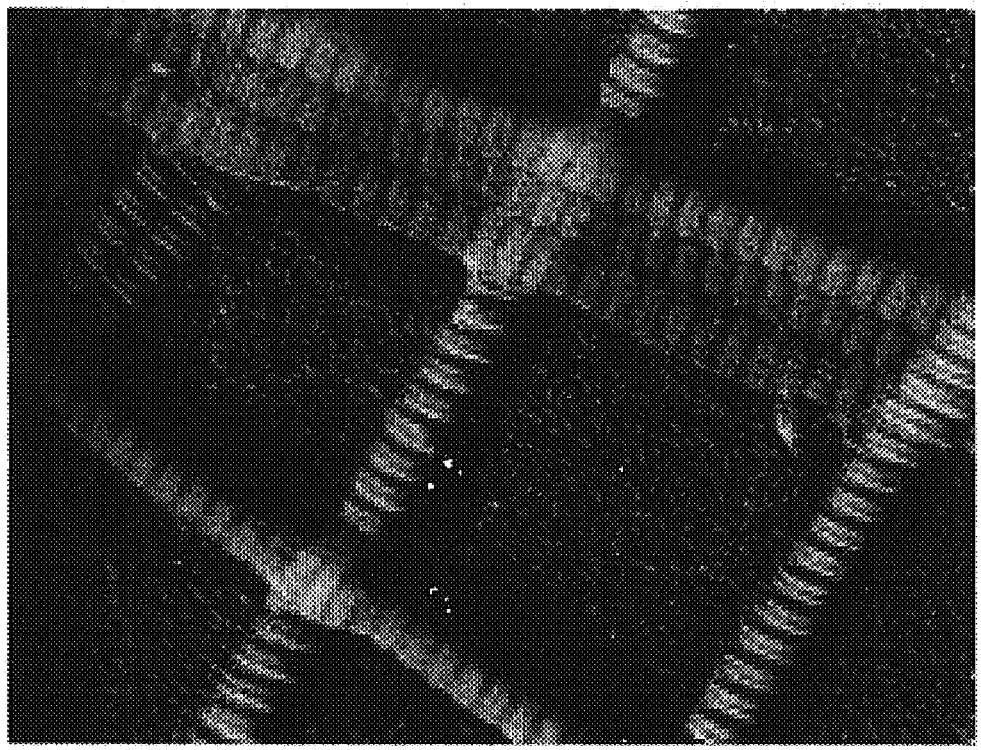
FIG. 1 shows a Scanning Electron Microscope (SEM) micrograph of human corneal fibrils that make up the cornea.

The disclosed invention affords the ability to adsorb or absorb various chemical species to the electrospun fibrils to limit the adhesive ability of ocular proteins which can reduce optical acuity, affect wear comfort, and impede diffusive characteristics of the lens media. Further, the disclosed invention can be utilized to adsorb or absorb pharmaceutical agents that can be utilized for ocular treatment or medicative purposes. In this light, the electrospun lens is a specialized therapeutic lens that delivers chemical species over a prescribed period of time, to a localized portion of the cornea to effect ocular treatment.

Creating Electrospun Contact Lens Structures

The disclosed invention offers a means of fabricating transparent contact lens structures that can be placed onto a recipient. In order to realize a suitable lens structure, fibrils of a suitable polymer, preferably "Hema", must be created and layered to form the basis of a "mat" which exhibits the transparency and diffusion characteristics of corneal stromal tissue. In the preferred embodiment, an electrospinning process produces the polymer fibrils. In this technique, the polymer under consideration, in this case collagen, is dissolved by a suitable solvent and injected under hydrostatic pressure into a conductive needle or capillary. A DC potential of preferably 4,000-12,000 volts is maintained between injection needle and a suitable target located at a distance away from the needle sufficient to preclude production of a coronal discharge or arc. The voltage is adjusted according the distance and desired fiber diameter and structure. The voltage difference between the injection needle and target suited to the given solvent conductivity, polymer, and flow rate, and the resulting electrostatic field at the needle tip, results in the formation of a Taylor Cone from the tip of which issues a jet of a micron sized jet which is attracted to, and impacts with, the ground cathode target. It should be stated that the applied voltage on the needle could be either positive or negative depending on the situation. Additionally, the voltage does not have to be a constant polarity, as it has been previously shown by Dr. John B. Fenn ("Electrospray Dispersion in an Alternating Current Mode"—U.S. patent application Ser. No. 10/460,725, Filed Jun. 11, 2003) that an alternating voltage prevents the charge buildup on electrospun fibers that contributes to a whipping instability. By simply alternating the applied needle voltage from a positive to a negative polarity, the electrospun fibers can be deposited at precise intervals to enable the construction of a precise electrospun "mat" of polymer material. This electrospun "mat" of polymer fibers could be constructed in such a way as to maintain mean fibril distance of approximately 200 nm ($10^{-9}$ meters). When evaporation of the solvent occurs from the electrospray jet, the result is fine micrometer ($10^{-6}$ meters) to nanometer ($10^{-9}$ meters) diameter polymer strands. The accumulation of such strands creates a "mat" of media having a diameter ranging from tens of microns or more down to tens of nanometers or less, depending on the concentration and nature of solute, the conductivity and viscosity of liquid, and the potential difference between the needle and target.

Collagen mats produced by this process can have diameters up to tens of millimeters and thickness of up to hundreds of microns, depending on deposition time. Similarly, it has been found that a variety of polymers for creating a suitable lens structures as part of this invention can be derived from a variety of sources. It should be noted that extrusion rather than electrospinning of the polymer are an alternative in certain instances, along with laser ablation and chemical etching, to form the lens curvature. Laser cutting is often employed since fibril terminations must be severed and should not be excessively frayed or tangled. Tangling or fraying can affect bonding to native collagen and can vary optical transparency. While the resulting collagen "mat" consists of disorganized fibrils, this does not interfere with required transparency or diffusive characteristics. The general theory for corneal transparency has to do with the diameter of the collagen fibers in reference to the wavelength of the incident light. Organization of the fibers appears to be of less importance. This conclusion is supported by the fact that shark cornea exhibits regions of disorganized fibers and random interfibrillar distances while yet exhibiting a high degree of optical transparency. Use of microspun collagen fibers allows control of the fibril diameter, and the deposition rate determines the interfibrillar spacing. There are existing patents that explain how to make a solid homogenous membrane permeable by various means, one in particular is European Patent Number [EP 0 331 090 A2], Co-inventors Akira Ikushima, and Takeyuki Sawamoto, "Process for Producing Contact Lens", which describes how to create microfine holes in an already existing lens material. This is a random dispersal of holes, and does not come close to the degree of permeability of the disclosed invention, additionally, it requires the use of an expensive, high powered particle accelerator with a subsequent chemical etching process. This method, although unique and innovative, is not commercially practical for producing a permeable contact lens. The disclosed invention has a superior method of obtaining permeability because it is made permeable from the ground up. From the very first collagen "mat" of fibrils, to the last, each "mat" is composed or a grid of collagen fibrils and not a solid surface of material. Traditional methods of making a contact lens permeable require that an existing solid lens be subjected to various processes that cause the creation of holes to be used. The described invention has these "controllable" holes throughout each fibril "mat" of material. The hole infrastructure is built into the lens right from the start, not as a last step in the production line.

Electrospinning Controlled Polymer Fibril Matrices

Figure 6:
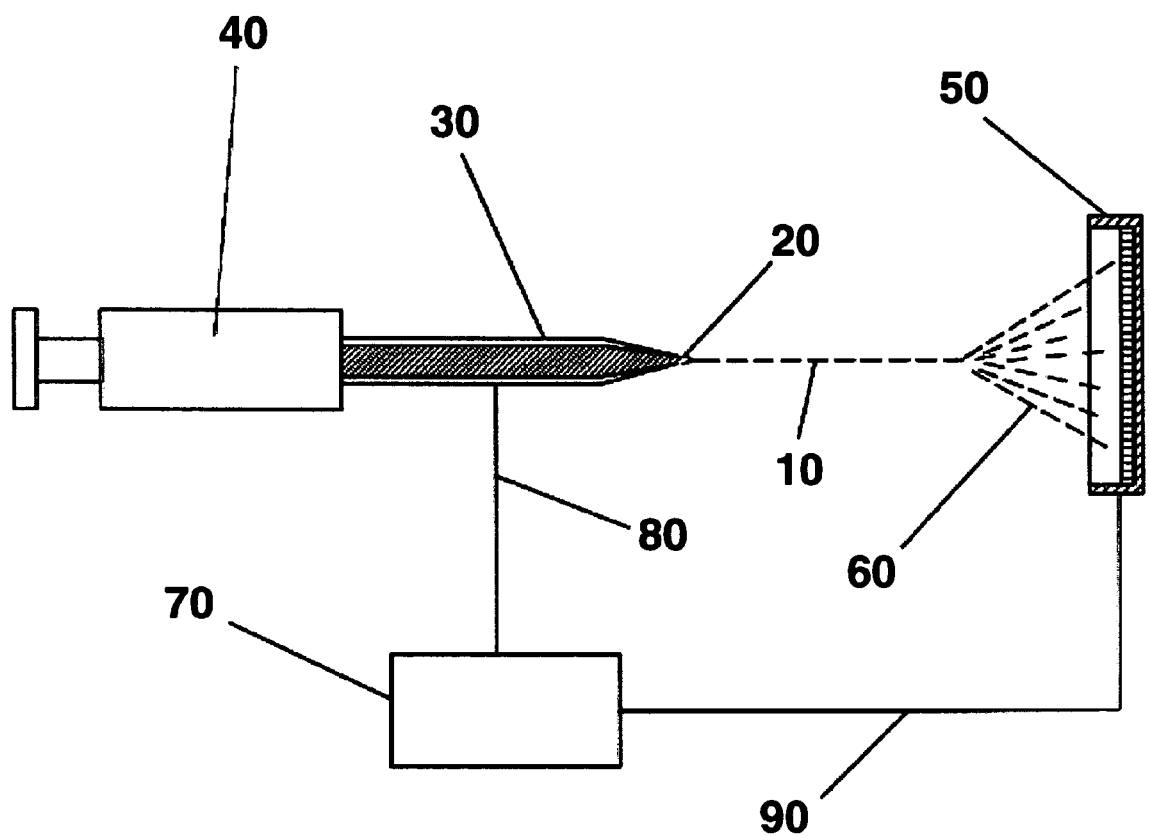
FIG. 6 details a schematic representation of an electrospray apparatus for the purposes of electrospinning.

Modification of the electrospinning process to yield a crosshatch pattern is achieved by maintaining either the needle anode at a fixed distance and moving the cathode target, or vice versa. Under normal conditions, the electrospun fiber is splayed about by the interplay of mechanical, hydrodynamic, and electrical forces so as to cause the polymer strand to accumulate on the target in a random pattern. While ordinarily this is not a problem in stromal scaffold "mat" construction, since the fiber diameter is the principal factor in transparency, there are instances where a regular matrix of stromal collagen is desired. By rapidly moving the needle in a linear direction for a fixed distance and then reversing such motion with respect to the target, while at the same time indexing the target utilizing a stepper motor drive or piezo stack or other such precision positioner, a series of relatively straight, parallel fibers may be laid down on the target surface. After the desired pattern has been achieved in one axis, the target may be rotated ninety degrees and the process repeated. Refer to FIG. 6. The outer fringes of a mat matrix so created will be less organized than the central axis as the outer edge is where target position reversal occurs. This area can be trimmed away and discarded with a suitable laser. The resulting central scaffold area exhibits a structure, pattern, and diameter that closely mimics natural stromal collagen. If even greater accuracy is required in fibril spacing, the distance the fiber is deposited across a moving target can be increased and the jet shut down at the point of maximum travel. The target is then indexed to the next position, the electrospinning jet reestablished, and the target rapidly moved to the opposite extreme, where the process is repeated until the maximum linear coverage area of fibers in one axis of orientation is achieved. The target may then be rotated preferably ninety degrees as before and the spinning procedure repeated. The intent is to create a grid of horizontal and vertical fibers.

Improvements to the electrospinning process include utilizing a source of free ions to neutralize the charge on the surface of the polymer jet to minimize Coulomb repulsion and thus the extent of fiber splaying of whipping. In addition, alternating the jet high voltage polarity at high frequency can decrease fiber charging. When utilizing an electrospray setup for the purposes of electrospraying or electrospinning, one of the main expenses and a great percentage of the system is that of the hydrostatic feed system. Traditionally these are complicated, expensive, and sophisticated syringe pumps, capable of delivering a controlled and regulated amount of liquid, down to nanoliters [$10^{-9}$ L]. Dr. John B. Fenn proposed using a passive, self-regulating feed system in the form of a wick ("Method & Apparatus for Electrospray Ionization"—U.S. Pat. No. 6,297,499 B1, Filed Jul. 3, 1998). As we all have experienced watching a burning candle, a flame keeps a perfect balance of melted wax and burning flame. As the melted wax is drawn up through the fibrous bundle we refer to as the wick, the flammable vapors from the melted wax are burned off at a constant rate. The wick keeps the rate of burn and the rate of fuel supply in a constant balance, and hence the flame remains constant (actually it is more accurate to state—nearly constant, due to variations in the compounds that make up the wax, the imperfect structure of the fibers that make up the wick itself, and variations in surrounding air flow, that all contribute to slight perturbations in the flame to cause a slight flicker now and then). This ability of the wick to draw up liquid against the force of gravity is known a capillary action. Capillary action is the ability of a liquid to move itself through the mechanism of its adhesion and cohesion. There are attractive forces that exist between similar or "like" molecules of a liquid that will cause the liquid to stick together. This affinity for sticking together is known as cohesion, and will cause a drop of water to merge with other drops of water, to create an ever-increasing mass of water. Another important property of capillary action is that of adhesion. As dissimilar or "unlike" molecules interact, there is an attraction that can exist in varying amounts.

In the case of water and glass, the water molecules are attracted to the glass molecules, and will be drawn towards the glass. If one has a small hollow glass tube, then the water will spontaneously start to rise up the tube against the force of gravity. As the amount of liquid increases by rising higher and higher up the hollow glass tube, or capillary tube, there will come a point where the weight of the liquid will exactly balance out the attraction between water and glass (adhesion) and the liquid will cease to rise any higher. For a liquid to rise in a capillary tube, the force of adhesion must be greater than that of cohesion. If the force of cohesion is greater than that of adhesion, then the liquid will not rise, but drop lower than the surrounding liquid level, and down into the capillary tube. This is the case if mercury is used; the cohesive forces are greater than that of the adhesion. For the most part, the wick fed candle is a marvel of nature, as there are no moving parts (not counting molecules and fluid flow) that can wear out, and it is entirely self-regulating. It would be cumbersome (but very possible) to construct a miniature pump that would both melt the wax and deliver a liquid flow at a regulated rate to keep the flame in balance. The difficulty would come in to play if one were asked to do this without any external power source and make sure it is reliable for a period of several years. Needless to say, nature has provided a very elegant solution to the problem of delivering a small and regulated amount of fuel to keep the system in perfect balance. Dr. John B. Fenn, who immediately saw the potential to electrospray applications, realized this fact. Nature has also provided a similar solution to that of supplying water to small plants and giant trees. Through the use of capillary action, the plant and in like manner the tree was designed with a liquid transport system utilizing capillary action. The tree and plant (actually the tree is a plant, but I use the term plant to distinguish relative size—a plant being small, like a single daisy, and the tree being large like a giant sequoia) both use a the same liquid transport mechanism that utilizes capillary action, but instead of small glass tubes, there is an equivalent vascular structure of tiny tubes running the length of the plants and trees called, Xylem and Phloem. The Xylem and Phloem together form a continuous vascular system that run lengthwise throughout the plant providing both water and structural stability. Multitudes of small holes of varying sizes are formed inside the fibrous bundle of material to establish the capillary action required to transport liquid throughout the organism.

It is this continuous network of holes running through the length of the plant that were sought to be copied into making a glass wicking structure for a passive fluid delivery system. Although there exist several techniques for drilling or producing small holes in glass, there are limitations as to the size and depth of those holes. Most places that actually drill through the glass have a size limit of about 4 or 5 thousandths of an inch, and that is only good for about a ⅛ of an inch. A glass wick would require holes on the order of micrometers or sub-micrometers in diameter and running the entire length of the wick structure, with the length from as small as half an inch, to as long as several feet. If a laser is used to drill tiny holes in the glass structure, then the limitation of a short depth is encountered. To construct an acceptable wick with the desired capillary hole size ranging from several micrometers in diameter to as small as half a micrometer through the length of the glass structure, only one item has been found to fit the bill—Holey fibers. A U.S. Patent Application for using a Holey Fiber as a passive hydrostatic feed source for Electrospray Applications was previously filed (Inventor Michael E. Dziekan, Holey Optical Fiber for Electrospray Applications—U.S. Patent Application No. 60/511,237, filed Oct. 15, 2003). In addition to using a Holey Optical Fiber for Electrospray applications, another patent was previously filed that specifies their use as a method of drug delivery called "A Method of Synthesis and Delivery of Complex Pharmaceuticals, Chemical Substances and Polymers through the Process of Electrospraying, Electrospinning or Extrusion utilizing Holey Fibers by" Co-Inventors Michael E. Dziekan and Joseph J. Bango, U.S. patent application Ser. No. 11/000,723. Through the use of a co-axial arrangement of holes in a Holey Fiber, it is possible to produce a combination of chemicals that combine on-the-fly to form new types of polymers. The arrangement of Holey Fibers could be made in such a way as to permit even three or more component chemicals to be produced by a single combination Fiber head. With this ability to send distinct chemicals through specific holes in the Holey Fiber, it would enable complex arrangements of polymers and drug combinations to be created. A coated polymer strand could be easily created, where it would be difficult by any other means. Besides the use of Holey Fibers, it is becoming more common to manufacture tiny electromechanical devices know as MEM s. These MEM s allow for intricate, self contained, very small manufacturing plants to be constructed. A provisional patent has been filed, "A Method of Utilizing MEMS based devices to Produce Electrospun Fibers for Commercial, Industrial and Medical Use", Co-Inventors Joseph J. Bango and Michael E. Dziekan application Ser. No. 11/004,149.

REFERENCE NUMERALS

Figure 2:
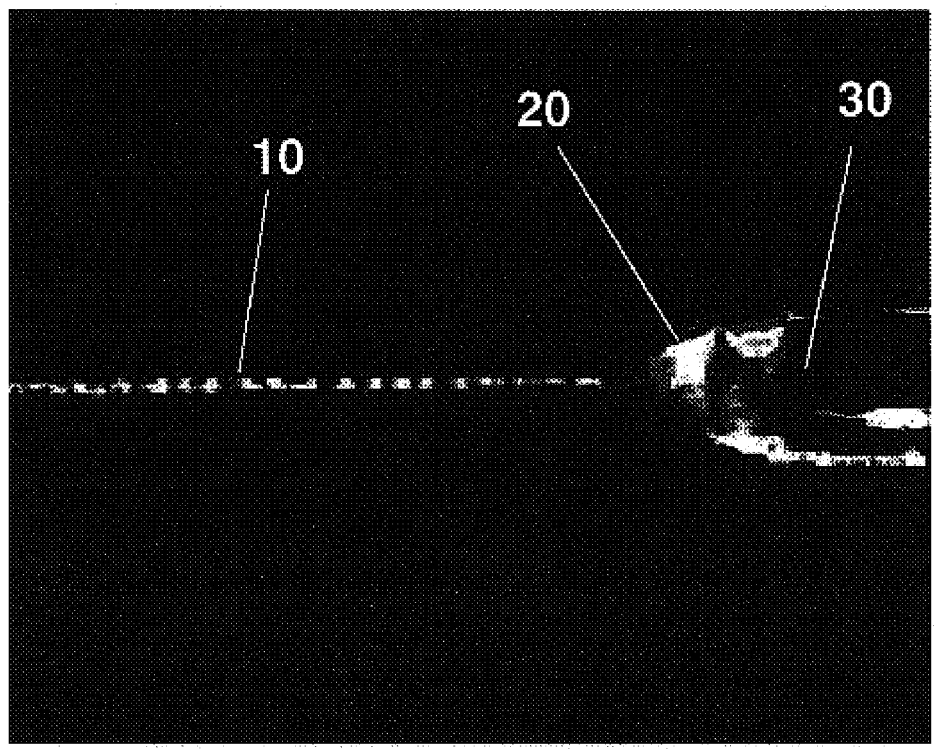
FIG. 2 shows a photographic image of a close-up view of an electrospray needle emitting a jet of fluid from the ensuing Taylor cone formation.
Figure 3:
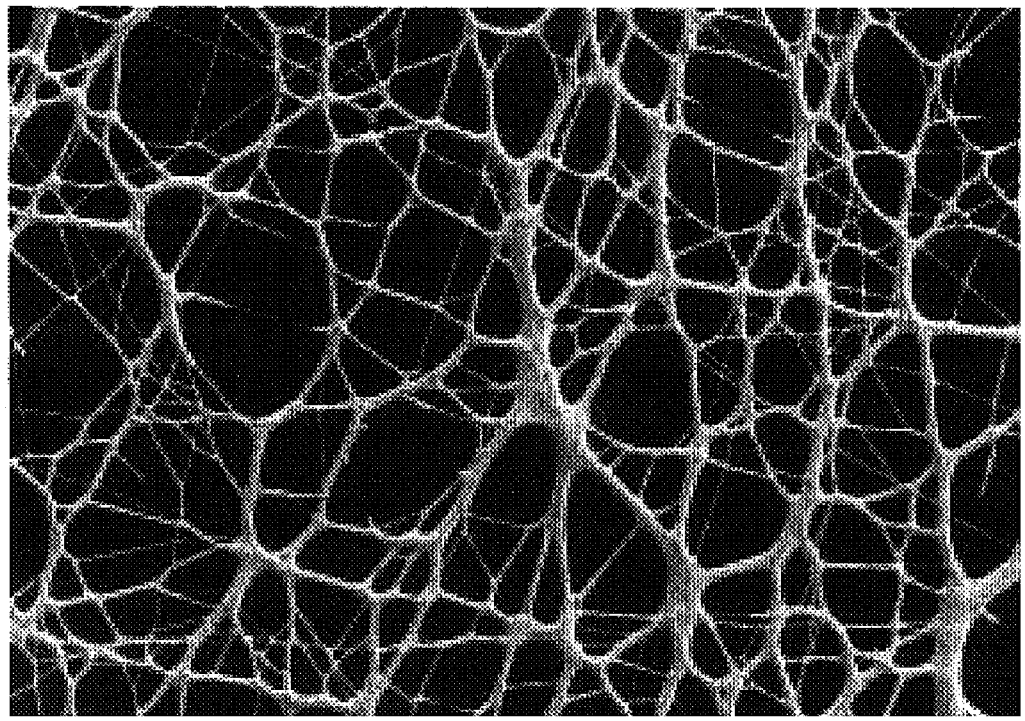
FIG. 3 shows a Scanning Electron Microscope (SEM) micrograph of electrosprayed polymer fibers in a random pattern from a large electrospray needle source-to-target distance.
Figure 4:
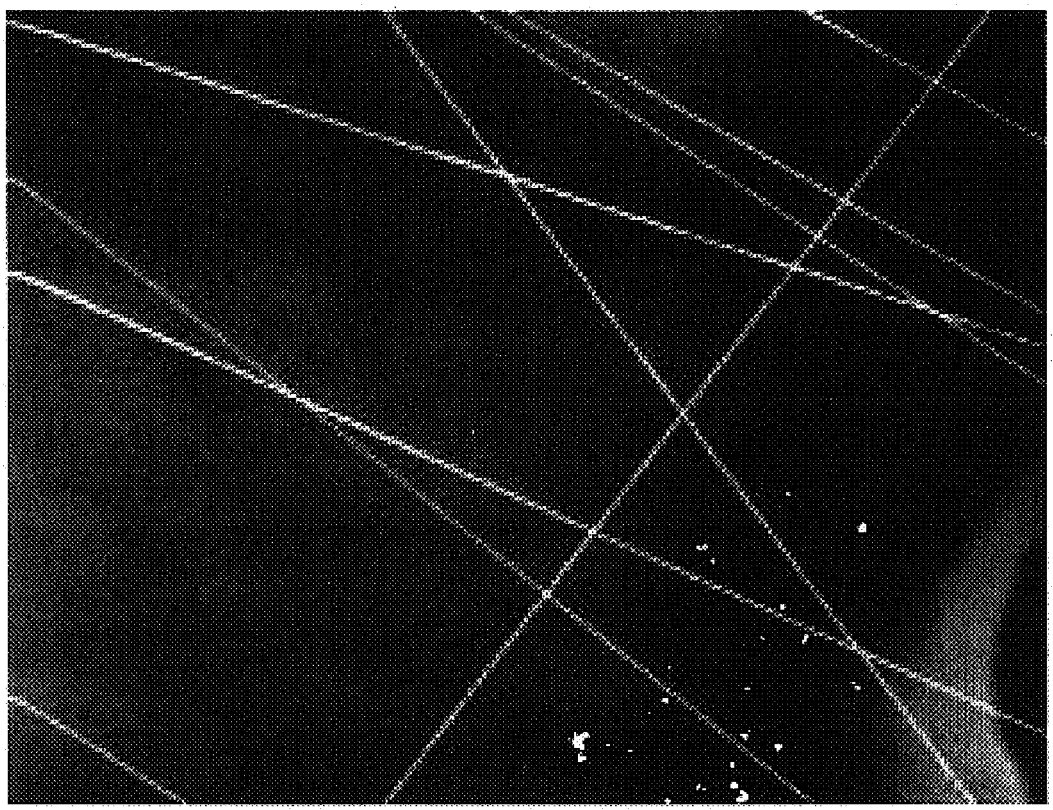
FIG. 4 shows a Scanning Electron Microscope (SEM) micrograph of electrosprayed polymer fibers in a random pattern from a close electrospray needle source-to-target distance.
Figure 5:
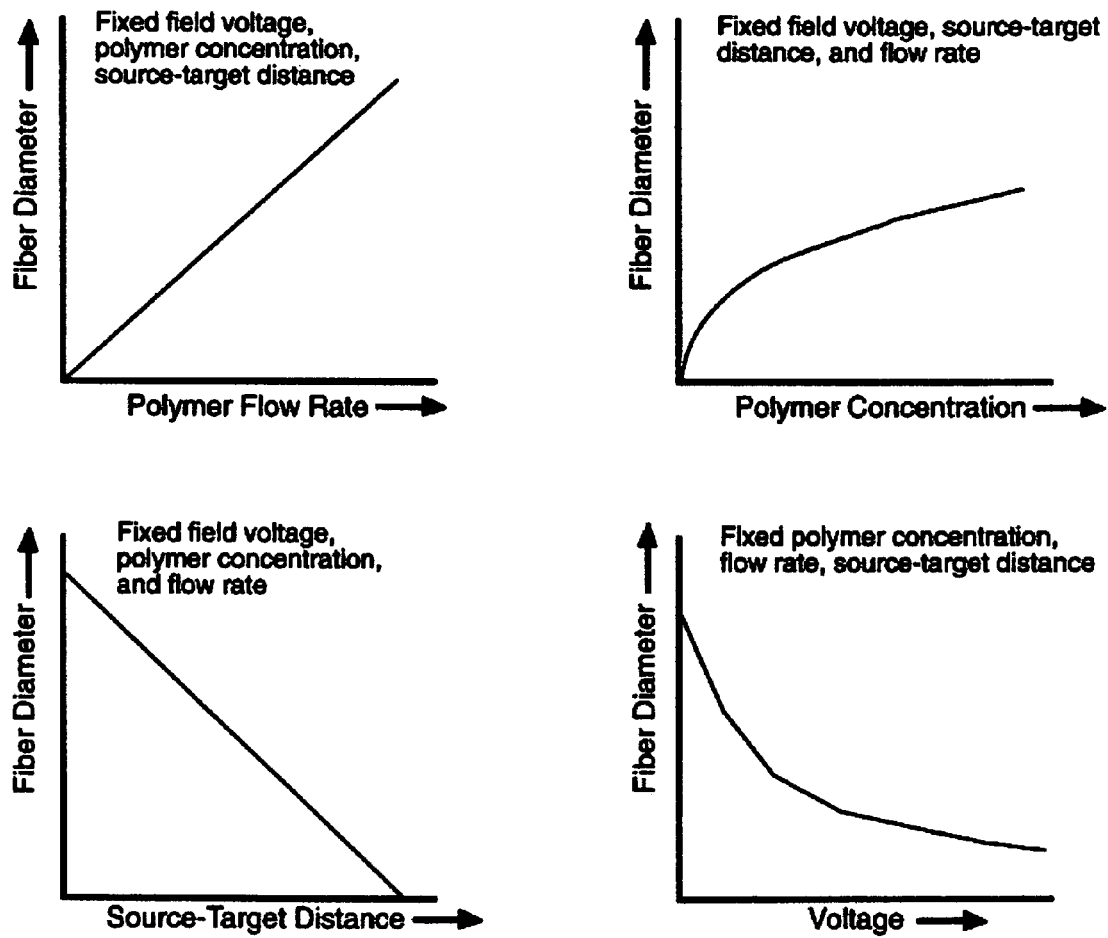
FIG. 5 shows a series of graphs indicating how the electrosprayed fiber diameter varies with different factors, such as applied voltage, polymer concentration, polymer flow rate, and source-to-target distance.
Figure 7:
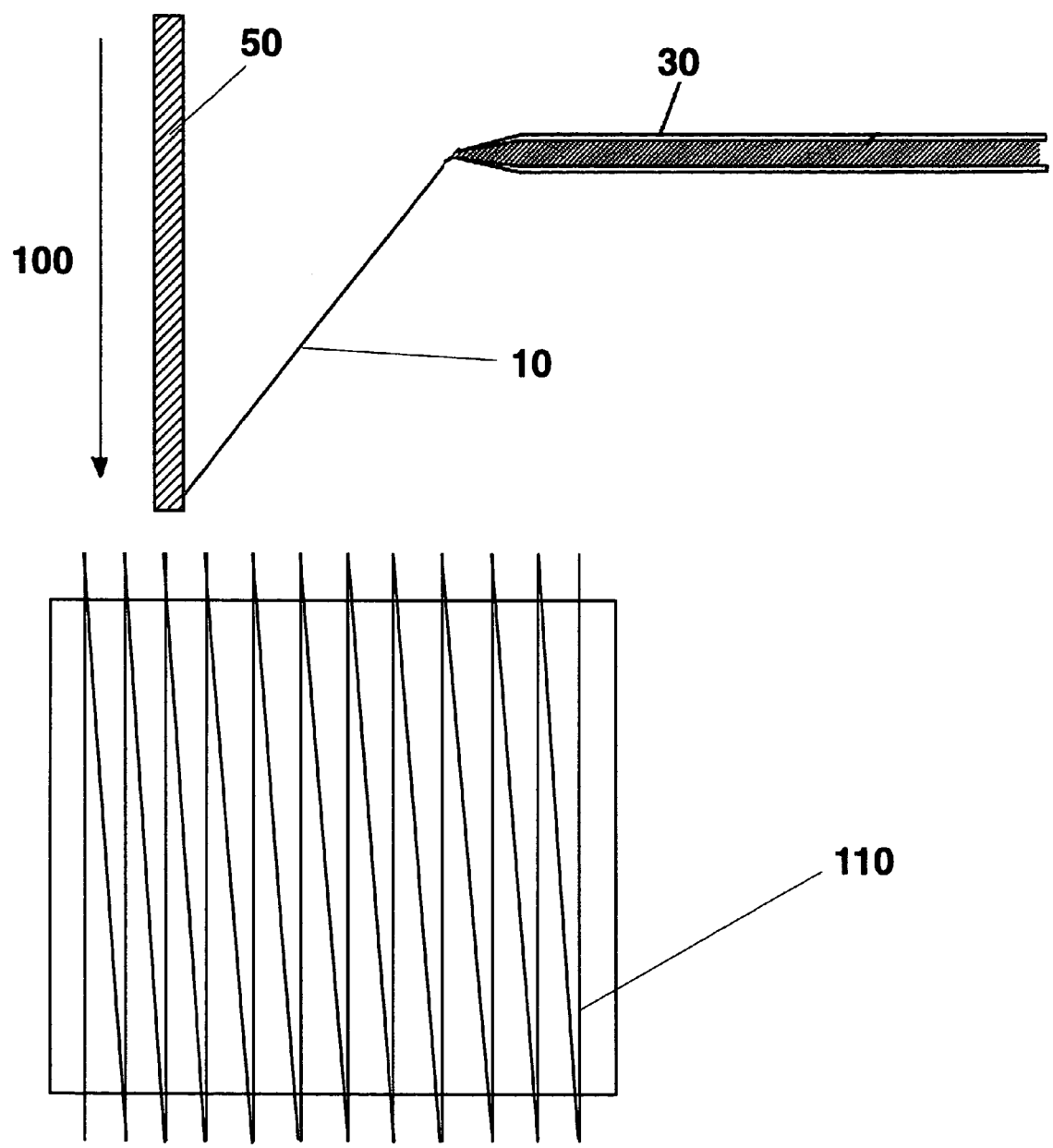
FIG. 7 details a schematic representation of a process for performing a controlled deposition of polymer fibers for the purposes of generating a "mat" of electrospun material.

FIG. 1:
Details the detail of human corneal stromal collagen fibrils obtained by scanning electron microscopy.
FIG. 2:
10 Resulting polymer jet produced at the apex of the Taylor Cone.
20 Taylor cone formation of liquid.
30 The electrospray needle that will supply the solution to be electrosprayed.
FIG. 3:
Detail of a Scanning Electron Microscope (SEM) micrograph of electrosprayed polymer fibers in a random pattern from a distant electrospray needle source to target distance. The distance between the electrospray needle and the target is relatively large.
FIG. 4:
Detail of a Scanning Electron Microscope (SEM) micrograph of electrosprayed polymer fibers in a random pattern from a close electrospray needle source to target distance. The distance between the electrospray needle and the target is relatively close as compared with that of FIG. 3.
FIG. 5:
Details a series of graphs indicating how the electrosprayed fiber diameter varies with different factors. The upper left graph displays how fibril diameter varies with increasing polymer flow rate. The upper right graph displays how fibril diameter varies with increasing polymer to solvent concentration. The lower left graph displays how fibril diameter varies with increasing source to target distance. The lower right graph displays how fibril diameter varies with increasing applied electrospray voltage.
FIG. 6:
10 Jet of electrospray that comprises the polymer fiber.
20 Taylor cone formation of liquid at end of electrospray needle.
30 Electrospray needle.
40 Hydrostatic feed pump that will meter the solution to be electrosprayed through the electrospray needle.
50 Target screen that the electrospun fibers will be deposited on.
60 Detail of whipping instability or splaying of fiber jet.
70 High voltage power supply that will apply voltage to the electrospray needle.
80 High voltage connection to the electrospray needle.
90 High voltage connection to the target screen grid.
FIG. 7:
10 Jet of electrospray that comprises the polymer fiber.
30 Electrospray needle.
50 Moving target that will have a buildup of electrospun fibers.
100 Direction of target motion.
110 Resulting raster pattern of fibers laid out on the target due to its reciprocating stepped motion.

We claim:

1. A method of creating a transparent permeable contact lens from a mat of polymer material formed of strands that exhibits the transparency and diffusion characteristics of corneal stromal tissue using the process of electrospinning, comprising the steps of:
  a. providing a power supply having an alternating output voltage adjustable over a range extending from 4,000 to 12,000 volts, the power supply providing its output to a first and second terminal,
  b. providing a conductive target having a surface on which to form a base surface (a cornea contact surface) of the contact lens, and a needle having a needle tip,
  c. electrically coupling the target to the power supply first terminal and the needle to the power supply second terminal to permit the power supply to provide an electric field between the target and the needle tip,
  d. dissolving a polymer solute in a suitable solvent,
  e. delivering said solute and solvent solution to the needle tip at a controlled pressure,
  f. adjusting the output voltage of the power supply to increase the electric field between the needle tip and target until a Taylor cone is formed, but not of a magnitude to result in a corona discharge or coronal effect,
  g. providing a means to vary the source to target distance,
  h. moving the needle in a linear direction for a fixed distance and then reversing such motion with respect to the target while at the same time indexing the target utilizing a precision positioner to obtain a desired pattern during electrospinning, and when the desired pattern has been achieved in one axis, the target is rotated ninety degrees and the process repeated, to provide the desired patterns over a region of the target exceeding the perimeter of the contact lens to be formed, depositing the electrospun material as a mat,
  i. alternating the polarity of the output voltage of the power supply between the target and the needle tip to prevent charge buildup on electrospun fibers and to permit the deposition of electrospun fibers to enable the construction of an electrospun mat of polymer fibers forming the transparent permeable contact lens, and j. trimming the desired patterns over the region of the target exceeding the perimeter of the contact lens to be formed to obtain the lens desired.

2. A method as in claim 1 where the needle is solid.

3. A method as in claim 1 where the needle is hollow.

4. A method as in claim 1 where the needle is a holey fiber.

5. A method as in claim 1 where the needle is a micro electro mechanical structure device.

6. The method of claim 1 at step h of moving the needle in patterns over a region of the target that exceeds the perimeter of the contact lens to be formed further comprises the step of:
controlling the potential during the electrospinning process to maintain a mean fibril distance of approximately 200 nm.

7. The method of claim 1 wherein step f further comprises: adjusting the electric field between the target and the needle tip, the controlled pressure applied to the solute and solvent solution in the needle, and the material temperature to control flow rate of the material onto the mat being formed on the target, the ambient temperature and the distance traveled across the lens region on the target and the gap between the needle tip and the target, to adjust the diameter of the fibers being deposited, the contact lens having an optical transparency that is adjusted by controlling the diameter of the collagen fibers being deposited.

8. The method of claim 1 further comprising the step of modifying step a for providing a power supply to be a step of providing a high voltage dc power supply providing its output to a first and second terminal and connecting the output terminals to the power supply output through a switching means for reversing the polarity of the output terminals at high frequency.

9. The method of claim 1 further comprising the step of modifying step a for providing a power supply to be a step of providing a high voltage ac power supply to output terminals.

10. The method of claim 1 wherein step d further comprises the step of dissolving a polymer of fiber materials selected from the group consisting of collagen and HEMA.

11. A method of creating a transparent permeable contact lens from a mat of polymer material formed of strands that exhibits the transparency and diffusion characteristics of corneal stromal tissue using the process of electro spinning, comprising the steps of:

a. providing a power supply having an alternating output voltage adjustable over a range extending from 4,000 to 12,000 volts, the power supply providing its output to a first and second terminal, b. providing a conductive target having a surface on which to form a base surface (a cornea contact surface) of the contact lens, and a needle having needle tip, c. electrically coupling the target to the power supply first terminal and the needle to the power supply second terminal to permit the power supply to provide an electric field between the target and the needle, d. dissolving a polymer solute in a suitable solvent, e. delivering said solute and solvent solution to the needle tip, f. adjusting the output voltage of the power supply to increase the electric field between the needle tip and target until a Taylor Cone is formed, g. providing a means to vary the source to target distance, h. moving the target with respect to the needle in a linear direction for a fixed distance and then reversing such motion with respect to the target while at the same time indexing the target utilizing a precision positioner during electrospinning, and when a desired pattern has been achieved in one axis, the target is rotated ninety degrees and the process repeated, to provide desired patterns forming the contact lens to be formed and controlling the potential during the electrospinning process to maintain a desired mean fibril distance, and i. alternating the polarity of the output voltage of the power supply between the target and the needle tip to prevent charge buildup on electrospun fibers and to permit the deposition of electrospun fibers at precise intervals to enable the construction of a precise electrospun mat of polymer fibers.

12. A method of creating a transparent permeable contact lens from a mat of polymer material formed of strands that exhibits the transparency and diffusion characteristics of corneal stromal tissue using the process of electrospinning, comprising the steps of:

a. providing a power supply for having an alternating output voltage adjustable over a range extending from 4,000 to 12,000 volts, the power supply providing its output to a first and second terminal, b. providing a conductive target having a surface on which to form a base surface (a cornea contact surface) of the contact lens, and a needle having a needle tip, c. electrically coupling the target to the power supply first terminal and the needle to the power supply second terminal to permit the power supply to provide an electric field between the target and the needle at a fixed distance from the target, d. dissolving a polymer solute in a suitable solvent e. delivering said solute and solvent solution to the needle tip f. adjusting the output voltage of the power supply to increase the electric field between said needle and target until an electrospinning cone is formed launching a spray of solute and solvent solution to the target, the voltage being adjusted to a magnitude that does not result in a corona discharge or coronal effect, g. providing a means to vary the source to target distance, h. moving the needle in a linear direction for a fixed distance and then reversing such motion with respect to the target while at the same time indexing the target utilizing a precision positioner during electrospinning, and when a desired pattern has been achieved in one axis, the target is rotated ninety degrees and the process repeated, to provide desired patterns over a region of the target exceeding the perimeter of the contact lens to be formed and controlling the potential during the electrospinning process to maintain a desired mean fibril distance, i. alternating the polarity of the output voltage of the power supply between the target and the needle to prevent preventing charge buildup on electrospun fibers and to permit the deposit of electrospun fibers at intervals to enable the construction of a electrospun mat of polymer fibers, j. adjusting the electric field between the target and the needle and the pressure applied to the dissolved polymer solute in the needle tip to control flow rate of the material onto the mat being formed on the target, the contact lens having an optical transparency that is adjusted by controlling the diameter of the collagen fibers and the spacing of the collagen fibers being deposited, and k. trimming the desired patterns over the region of the target exceeding the perimeter of the contact lens to be formed to obtain the lens desired.

13. The method of creating a contact lens from a mat of polymer material of claim 11 further comprising:

providing a source of free ions and directing the free ions to the Taylor Cone in step f to further reduce a charge induced whipping of the spray of solute and solvent solution moving to the target.

14. The method of creating a contact lens from a mat of polymer material of claim 12 further comprising:

providing a source of free ions and directing the free ions to the electrospinning cone in step f to further reduce charge induced whipping of the spray of solute and solvent solution moving to the target.

* * * * *